Figure 1:
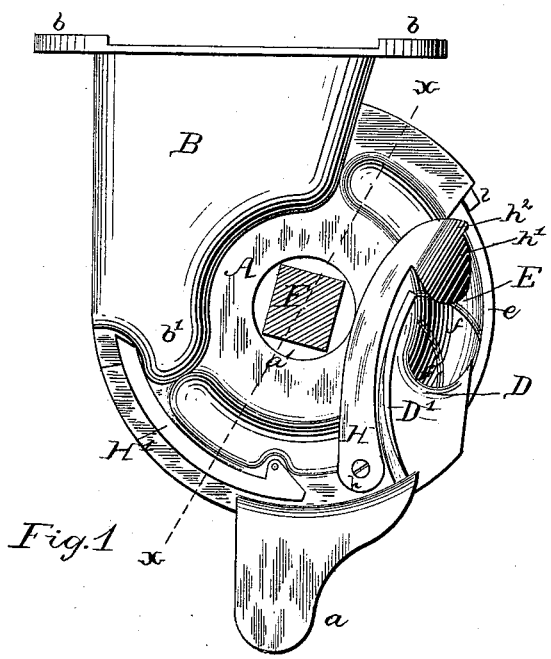

(Model.)

2 Sheets—Sheet 1.

H. E. COLE.
SEED OR GRAIN DISTRIBUTING DEVICE.

No. 336,390.                    Patented Feb. 16, 1886.

Witnesses
A. A. Moon,
A. A. Connolly

Inventor
H. Earl Cole
by Connolly Bros.
Attorneys (Model.) 2 Sheets—Sheet 2.

H. E. COLE.
SEED OR GRAIN-DISTRIBUTING DEVICE.

No. 336,390. Patented Feb. 16, 1886.

Witnesses
A. A. Moore
A. H. Connolly

Inventor
H. Earl Cole
by Connolly Bros.
Attorneys

UNITED STATES PATENT OFFICE.

H. EARL COLE, OF ALLEGHENY CITY, PENNSYLVANIA.

SEED OR GRAIN DISTRIBUTING DEVICE.

SPECIFICATION forming part of Letters Patent No. 336,390, dated February 16, 1886.

Application filed September 9, 1885. Serial No. 176,578. (Model.)

*To all whom it may concern:*

Be it known that I, H. EARL COLE, a citizen of the United States, residing at Allegheny City, in the county of Allegheny and State of Pennsylvania, have invented certain new and useful Improvements in Seed or Grain Distributing Devices; and I do hereby declare the following to be a full, clear and exact description of the invention, such as will enable others skilled in the art to which it appertains to make and use the same.

This invention has relation to seed-distributers for seeding-machines, and relates more particularly to that class of distributers wherein the seed or grain, or other substance which is to be sown, is conveyed from a suitable receptacle or box through a seed-cup having an open mouth and an annular cylindrical recess open on one side through the medium of a ribbed disk, which is attached to and revolved through the medium of a shaft extending from side to side of the machine, and provided with a gear-wheel or gear-wheels meshing with a gear-wheel upon the axle of the machine.

My invention has for its object the provision, in a seed-distributing machine, of means whereby the material to be sown, whatever its character, may be distributed in an even and continuous stream from any one or all the drills of a seeding-machine.

My invention has for its further object the provision of means for regulating the amount of seed or other material distributed, and my invention has for its still further object the provision of means for preventing any clogging of the delivery apparatus, or any crushing, cracking, breaking, or injury to the grain, seed, or other material to be sown.

My invention accordingly consists in the novel construction, combination, and arrangement of parts, as hereinafter described and claimed.

In carrying my invention into effect I propose to dispense with the necessity of employing variable gearing to drive the disk by means of which the grain is forced through the seed-cup, and in lieu thereof I have devised means for regulating the rate of distribution and the amount distributed, and for adapting the machine to operate upon various widely-differing kinds of grain or seed without changing the rate of revolution of the main shaft or of the disks through whose medium the grain or other material is carried through the seed-cups, such means being, briefly, by the adjustment, through mechanism hereinafter described, of a revolving dished or cupped plate toward or away from the face of the seed-cup.

Figure 2:
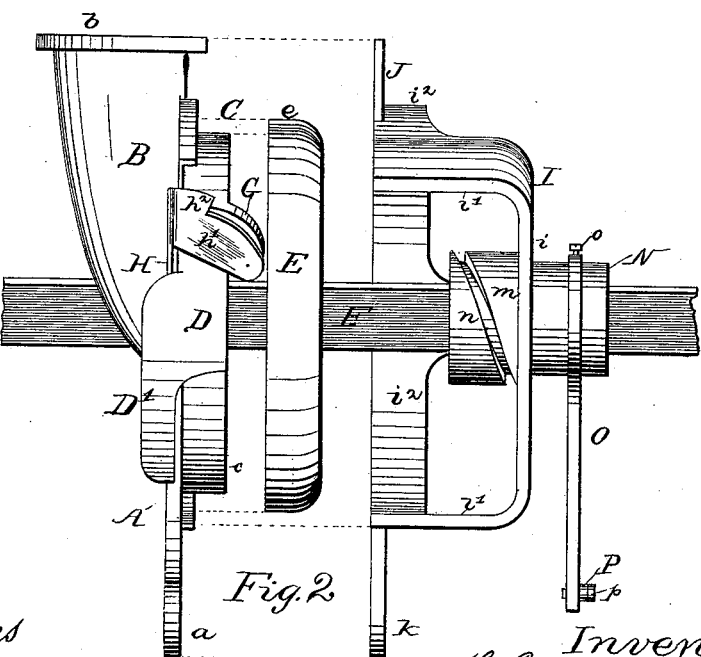
Figure 4:
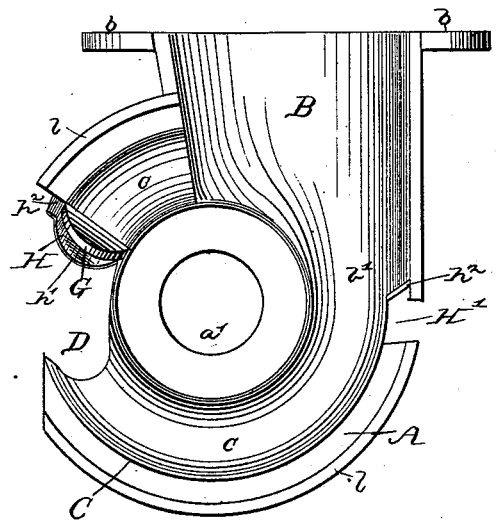
Figure 5:
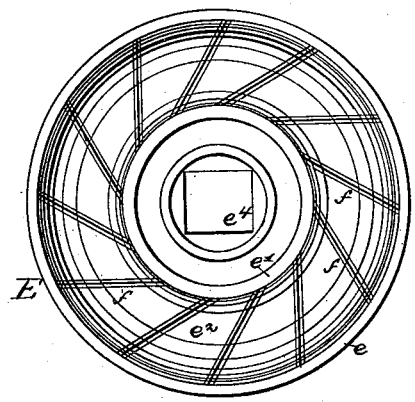
Figure 3:
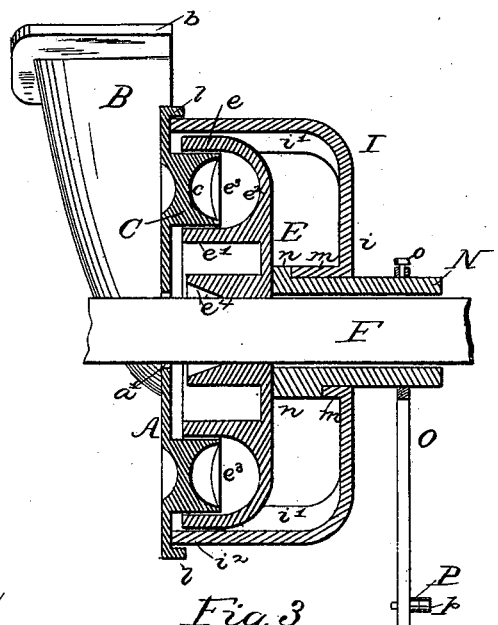

Referring to the accompanying drawings, Figure 1 is a side view of my improved distributing device in its entirety; Fig. 2, an edge view of the same, the several parts being separated to more clearly show their construction; Fig. 3, a vertical sectional view on the line $x$ $x$ of Fig. 1; Fig. 4, a plan view of the inner side of the face-plate of the seed-cup, and Fig. 5 a similar view of the revolving disk.

A designates the main portion of the seed-cup, which I will call the "face-plate." This face-plate is of circular form, and is formed integral with three sides of the seed-cup, lettered B, and a depending lug, $a$. The seed-cup B has flanges $b$ $b$ at its top, through which pass screws, bolts, or other fastening devices, by means of which it is secured to the bottom of the seed-box. The casing A has an opening, $a'$, for the passage of the main shaft of the machine, and concentric therewith is formed an annular wide ridge, C, which has its surface concaved, as shown at $c$, such concavity running up into and being continuous with the lower end, $b'$, of the seed-cup B. At D the ridge C is cut away to form the exit for the seed, and at the left-hand side and upon the outside of the casing A (looking at Fig. 1 of the drawings,) a curved lip, D', is formed, which serves to direct the grain or seed to the dropping-tubes after it is delivered from the mouth D.

E designates the revolving disk by means of which the grain, seed, or other material is delivered from the seed-cup. Said disk is provided with a wide flange, $e$, at its edge, which fits nicely over the exterior of the ridge C and a flange, $e'$, around its central opening, $e^4$, which latter is squared to fit the square driving-shaft F. The space between the flanges $e$ $e'$ is concaved at its bottom, as shown at $e^3$, and upon said bottom are formed ribs $f$ $f$ $f$, tangentially arranged with respect to the flanges $e$ $e'$.

When in position against the casing A, the flange $e$ closely embraces the raised portion or ridge C, and the flange $e'$ fits snugly inside thereof, leaving between the concave portion $e^2$ of the disk and the concavity $c$ on the face of the raised portion C a circular or nearly circular throat, $e^3$, for the passage of the grain from the seed-cup to the mouth D. A slanting ear, G, which is formed upon the ridge C, projects into the throat $e^3$ at the top of the mouth D, and prevents any of the grain or seed from being carried up past the mouth and back into the seed-cup. A flat spring, H, is secured in any suitable manner—such as by screws or rivets—to the outside of the casing A at $h$, and at its upper end is provided with a wing, $h'$, which projects into the mouth D just in front of the ear G, and also serves to prevent any passage of the grain or other material above that point. A tooth, $h^2$, is formed on the upper side of the wing H, and said tooth, bearing always upon the flange $e$ of the disk, serves to prevent the wing from projecting too far into the space between the flanges $e$ and $e'$, and thereby scraping against the ridges $f f f$. Upon the opposite side of the casing a similar flat spring, H', having a wing, $h^2$, projects into the throat, and prevents any of the contents of the seed-cup from falling down between the edge of the flange $e$ and the face of the plate A.

I designates a spider comprising the central hub, $i$, the arms $i'$ $i'$ $i'$, and the flange $i^2$, joined to said hub by said arms. A triangular or nearly triangular plate, J, is formed upon the edge of the flange $i^2$, and fits up against and closes the open side of the seed-cup A, a depending lug, $k$, on the lower edge of the flange, abutting against the lug $a$ on the casing A, suitable screws or bolts through the plate J and the lugs $a$ $k$ serving to keep the spider in position upon the casing. The flange $i^2$ of the spider bears against the inside of the casing A and embraces the exterior flange, $e$, of the disk C, a narrow flange, $l$, on the casing embracing the flange $i^2$ and preventing any leakage of grain between the casing and the flange. At the center of the hub of the spider I a hole is formed, and around said hole on the inside of the hub are formed half-round inclined ways $m$ $m$ and a bush, N, which fits freely in the hole of the hub, and is provided on its exterior with similarly-inclined ways $n$ $n$, which bear against the ways $m$ $m$, and serving, when the bush is revolved, to advance the latter forward in the direction of the shaft. The inside end of the bush N bears against the face of the disk E and its outer end, which projects beyond the hub of the spider, passes through an eye in the end of a rocking lever, O, and said lever is secured thereto by a set-screw, $o$. To the lower end of the lever O a rod, P, is secured by a screw, $p$.

As it is usual to place a number of distributers on a single feeding-machine, the rods O O O, leading from the several bushes of the distributers, are all connected to a suitable operating-lever, P, under the control of the driver.

Operation: The parts being constructed and arranged as described, and the distributing mechanism attached in position on a seeding-machine, the dropping-tube surrounding the lower end of the casing, so as to catch all the seed or other material as it falls from the mouth D, the shaft F is revolved by the forward movement of the machine, and the disk E is turned, thereby drawing the seed or grain from the bottom of the seed-cup and around through the cylindrical throat $e^3$ until it reaches the mouth D, the ear G serving to direct it into the dropping-tube. When it is desired to regulate the amount of seed which will pass out through the throat $e^3$ and mouth D, it is only necessary to move the disk E in toward or out from the casing A, thereby regulating the size of the throat, and, as the disk revolves always at the same rate of speed, consequently regulating the amount of seed or grain distributed in a given time over a given area. It will be noted that the adjustment can be made in the most gradual manner, or the extreme of adjustment from the greatest to the least degree may be made almost instantaneously in all the distributing devices of the machine by operating the rods O O, as hereinbefore described.

While I have described the application of my improved distributer to a seed-sowing machine, and while it is particularly applicable to such machines, it is obvious that it may be applied to any machine or in any position where it is desirable to distribute grain, seeds, fertilizers, or other material in an even and regular manner from a receptacle of any kind. For instance, in flour-mills, where the grain is distributed to the millstones or to rollers, my device is admirably adapted to take the place of the usual shoe which conveys the grain from the hopper to the eye of the millstone, and which is agitated by means of a projection on the spindle. It will be therefore understood that I do not confine the scope of my invention to the application of the device to a seed-sowing machine.

Having described my invention, I claim—

1. In a seed-distributing device, the combination, with a seed-cup having a face-plate with a grooved annular ridge, and a revolving disk provided with concentric flanges adapted to embrace said ridge, and thereby form a throat for the passage of the material to be distributed, of means, substantially as described, for adjusting the disk horizontally upon the said ridge, and thereby regulating the size of the throat, substantially as described.

2. In a device for distributing seed or grain, the combination, with a casing comprising a seed-cup, a face-plate, and a ridge thereon, of a revolving disk having annular flanges adapted to embrace said ridge, and thereby form a throat for the passage of the material from the hopper, substantially as described.

3. In a distributing device, the combination, with a face-plate and a ridge thereon having a concave face communicating with a seed-cup, of a disk having annular flanges adapted to embrace said ridge and a concave bottom to the space between said flanges, forming a circular or nearly circular throat between said disk and ridge, substantially as described.

4. In a seed or grain distributer, the combination, with a casing, A, having a seed-cup, B, and a ridge, C, of the flanged disk E, embracing said ridge, the spider I, having the inclined ways $m\ m$, and the bush N, also provided with inclined ways $n\ n$, all constructed and arranged substantially as described, whereby when the said bush is turned the disk will be caused to approach toward or recede from the casing, as set forth.

In testimony whereof I have affixed my signature in presence of two witnesses.

H. EARL COLE.

Witnesses:
   LOUIS MOESER,
   IG. STAUFFER.